United States Patent
Ravindra et al.

(10) Patent No.: US 8,352,508 B2
(45) Date of Patent: Jan. 8, 2013

(54) IMPACT-BASED ARRANGEMENT OF IMAGES ON AN ELECTRONIC DISPLAY

(75) Inventors: Guntur Ravindra, Mysore (IN); Suresh Kumar Chintada, Bangalore (IN); Naidu Shrikant, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 108 days.

(21) Appl. No.: 13/106,907

(22) Filed: May 13, 2011

(65) Prior Publication Data
US 2012/0290570 A1 Nov. 15, 2012

(51) Int. Cl.
*G06F 17/00* (2006.01)
(52) U.S. Cl. ......... 707/802; 707/791; 707/822; 707/828
(58) Field of Classification Search ........... 707/600–899
See application file for complete search history.

(56) References Cited

U.S. PATENT DOCUMENTS

| | | | |
|---|---|---|---|
| 6,057,842 A | 5/2000 | Knowlton et al. | |
| 7,426,693 B2 | 9/2008 | Shohfi et al. | |
| 7,484,183 B2 | 1/2009 | Look et al. | |
| 7,512,881 B2 | 3/2009 | Haynes et al. | |
| 2006/0161863 A1 | 7/2006 | Gallo | |
| 2006/0170793 A1* | 8/2006 | Pasquarette et al. | 348/240.99 |
| 2007/0209025 A1 | 9/2007 | Jing et al. | |

* cited by examiner

*Primary Examiner* — Isaac M Woo

(57) ABSTRACT

Disclosed are methods for arranging list elements (e.g., results returned by a user search) according to anticipated "impact." Thumbnails of the top elements are displayed on a screen of the user's device, with the size of each thumbnail related to that result's anticipated impact. In some embodiments, the arrangement of these thumbnails on the display screen is also based on the anticipated impacts with larger thumbnails placed near the center of the screen and successively smaller thumbnails arranged farther away. Different embodiments may calculate the anticipated impacts differently. The impact can be related to the rank order as assigned by a search engine. Any information about the user's current situation can go into the calculation of the anticipated impact. When the user is searching for information, longer video results may be assigned a larger anticipated impact because they are more likely to contain the wanted information.

19 Claims, 5 Drawing Sheets

US 8,352,508 B2

IMPACT-BASED ARRANGEMENT OF IMAGES ON AN ELECTRONIC DISPLAY

FIELD OF THE INVENTION

The present invention is related generally to computing devices and, more particularly, to visually displaying information on a computing device.

BACKGROUND OF THE INVENTION

The amount of information available on-line keeps growing at an ever accelerating pace. In many ways, this is a beneficial trend, and information is now available to help a typical user perform any number of typical tasks.

However, the very quantity of available information can be counter-productive. When a user performs an on-line search to find information relevant to a task that he is performing, he is often overwhelmed by the results: So many search "hits" are returned that the user may have a difficult time deciding which, if any, are the most relevant to the task at hand. While the user may have a high level of confidence that the information he needs can be found somewhere in the search results, this confidence does him little good if he cannot quickly sort through the mass of returned information to find the exact information that is most helpful to him.

This problem is exacerbated when the search results include videos. A user may be able to quickly scan and evaluate still images, but he may have to actually spend time viewing each video to determine if it is of interest to him. Rather than presenting video results one by one, various search engines provide multiple windows on the display screen of the user's device, where each window displays a small "thumbnail" of one video hit. This arrangement, however, often does not help the user to quickly scan through the videos: The multitude of simultaneous video thumbnails merely reinforces the user's sense of "information overload."

As is well known, when a search engine retrieves a list of hits, it runs an algorithm to rank those hits according to some kind of relevance and then presents the hits to the user in an ordered ranking. With video results for example, the search engine may display thumbnails of only the "top" (that is, the most relevant as perceived by the search engine) four or five hits. However, the relevance-ranking algorithm used by the search engine may have little or nothing to do with the task that the user who requested the search is attempting to perform.

BRIEF SUMMARY

The above considerations, and others, are addressed by the present invention, which can be understood by referring to the specification, drawings, and claims. According to aspects of the present invention, list elements (e.g., results returned by a user search) are ranked by anticipated "impact." Thumbnails of the top elements are then displayed on a screen of the user's device, with the size of each thumbnail related to that result's anticipated impact (generally, the larger the anticipated impact, the larger the thumbnail). This helps the user because his attention is drawn to the larger thumbnails that correspond to the elements with the greater anticipated impact.

In some embodiments, the arrangement of these thumbnails on the display screen is also based on the anticipated impacts. For example, the larger thumbnails (i.e., those corresponding to the elements with the larger anticipated impacts) are placed near the center of the screen, and successively smaller thumbnails are arranged farther and farther from the screen's center. Again, the user's focus, naturally drawn to the center of the display screen, is directed toward the elements with the highest anticipated impacts.

Different embodiments (and different situations encountered by the same embodiment) may calculate the anticipated impacts differently. The impact can be related to the rank order as assigned by a search engine, for example. In another example, when the elements are provided by a commercial entity (e.g., images of products for sale by that commercial entity), then that entity can assign a higher impact to products that provide a higher profit to the entity. Any information about the user's current situation (e.g., the time of day or his present physical location) can go into the calculation of the anticipated impact. For example, if the user is searching for local restaurants, those restaurants that serve breakfast may be assigned a larger anticipated impact if the search is performed early in the morning. When the user is searching for information, longer video results may be assigned a larger anticipated impact because they are more likely to contain the wanted information.

While especially useful when the elements include video clips, aspects of the present invention apply as well with still images, music, and any mixture of media. The actual display is tailored to the capabilities of the user's device including the size of the display screen and whether or not the device can display three-dimensional images.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
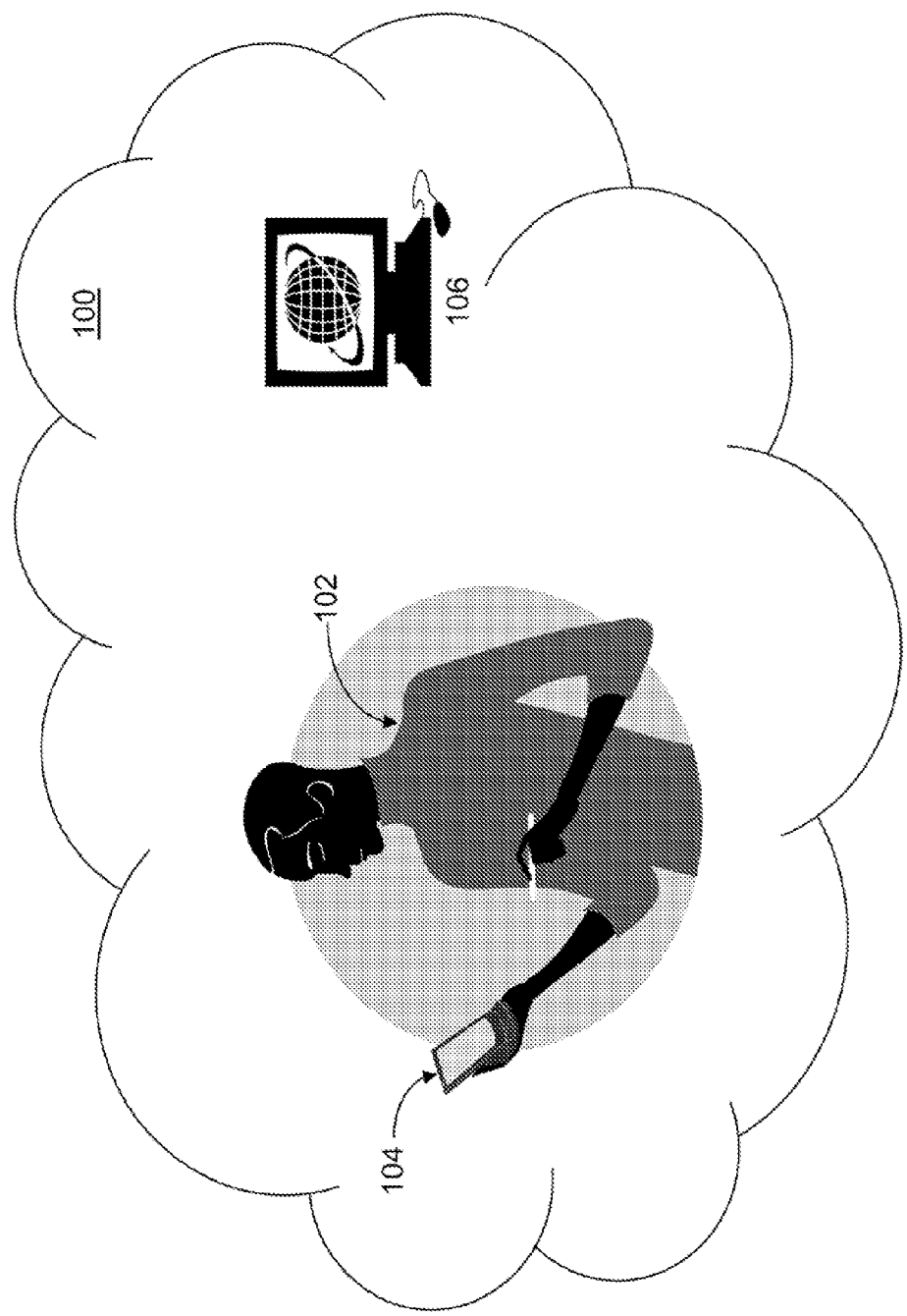
FIG. 1 is an overview of a representational environment in which aspects of the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, a user 102 wishes to view a list of images on the display screen of his electronic device 104. The list may be the result of, for example, an Internet search run by the user 102. In some embodiments, the list is provided by a commercial entity, such as a retailer listing goods for sale. In any event, the images themselves may come from any of a number of sources: They may be retrieved from a local storage on the device 104 or may be retrieved from one or more remote servers 106, the retrieving facilitated by a communications network 100.

Figure 2:
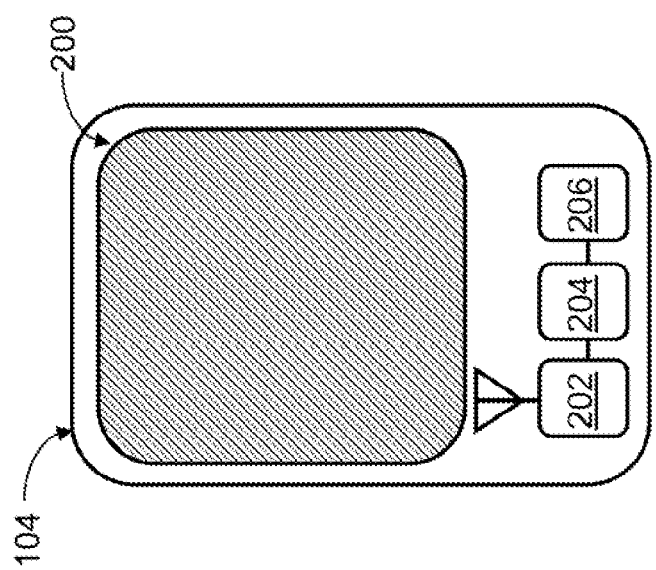
FIG. 2 is a generalized schematic of a device embodying aspects of the present invention.

FIG. 2 shows a representative electronic device 104 (e.g., a cellular telephone, personal digital assistant, personal computer, digital sign, interactive kiosk, set-top box, or two- or three-dimensional television) that incorporates an embodiment of the present invention. FIG. 2 shows the device 104 as a cellular telephone presenting its main display screen 200 to its user 102. Typically, the main display 200 is used for most high-fidelity interactions with the user 102. For example, the main display 200 is used to show video or still images, is part of a user interface for changing configuration settings, and is used for viewing call logs and contact lists. To support these interactions, the main display 200 is of high resolution and is as large as can be comfortably accommodated in the device 104. In some situations, it would be useful for the user 102 to have access to a display screen even larger than the main display 200. For these situations, a larger external display can be connected to, and controlled by, the device 104 (e.g., through a docking station). The device 104 may have a second and possibly a third display screen for presenting status messages. These screens are generally smaller than the main display screen 200. Embodiments of the present invention can be applied to these screens as well as to the main display screen 200, but for the sake of brevity, these additional screens are ignored for the remainder of the present discussion.

A typical user interface of the electronic device 104 includes, in addition to the main display 200, a keypad and other user-input devices. The keypad may be physical or virtual, involving virtual keys displayed on a touch screen 200.

Figure 3:
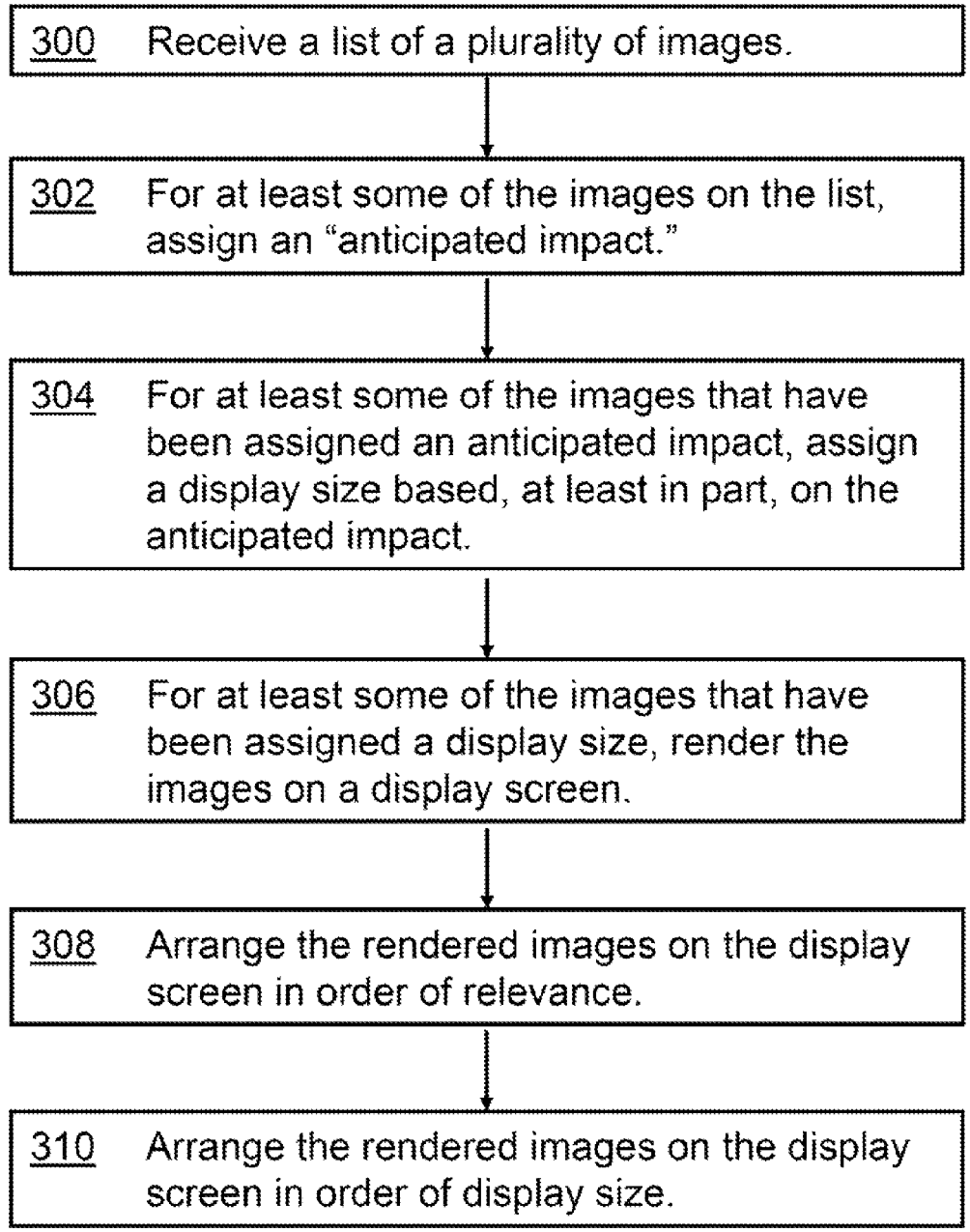
FIG. 3 is a flowchart of a method for using anticipated impacts when arranging images on a display screen.

FIG. 2 illustrates some of the more important internal components of the electronic device 104. The network interface 202 sends and receives media presentations, related information, and download requests. The processor 204 controls the operations of the device 104 and, in particular, supports aspects of the present invention as illustrated in FIGS. 3 and 4, discussed below. The processor 204 uses the memory 206 in its operations. Specific uses of these components by specific devices are discussed as appropriate below.

FIG. 3 presents one embodiment of the present invention. The method of FIG. 3 begins in step 300 when the electronic device 104 receives a list of a plurality of images. Often, the list will be the result of a search performed by the user 102. The images may be received from a remote server 106, may be retrieved from a memory 206 local to the device 104, or may come from a variety of such sources. The list may include both moving images and static images.

In step 302, at least some of the images on the list are assigned an anticipated impact. (For the sake of brevity, "anticipated impact" is often shortened to "impact" in the present discussion.) Different embodiments use different methods for assigning an impact. In one embodiment, the impact can mimic the relevance order assigned by a search engine. (Relevance is a well known concept in the art. As one example of computing relevance, a user's query string is compared with audio transcripts that accompany video snippets. Audio transcripts that match more terms in the query are more relevant. The number of matching terms for a transcript is the "relevance" assigned to that transcript, and the accompanying video snippets are ordered accordingly.) That is, the first "hit" returned by the search engine is assigned the highest impact, the second hit is assigned the next highest impact, and so on. In most embodiments, the relative size of the assigned impacts is more relevant to the present invention than are the actual values of the impacts.

In another embodiment, the assigned impacts reflect how much information each image may be able to provide to the user 102. For moving images, a longer video clip may be assigned a higher impact than a short clip.

In yet another embodiment, the assigned impact reflects the importance of that image to the provider of the image. For example, the list of images may be the result of a search run by a retailer. Then, the retailer assigns higher impacts to images of products that produce greater profits for the retailer.

In still another embodiment, the assigned impact reflects a rating of an image, the rating given by, for example, members of a social network that includes the user 102.

As a final example, the impact can reflect a "situational awareness" such as the time of day when a search is performed, or the physical location of the user 102 when he performs a search. Items on the list that are deemed to be more appropriate to the current situation (e.g., pancake houses if a search for restaurants is performed early in the day) can be assigned a greater impact.

The above factors, and others, can be compared and combined when assigning the impacts.

As seen above, different methods of determining the impact may be appropriate in different situations. The impacts may be received from the same source that sent the images themselves, or may come from a separate source. For example, the electronic device 104 can receive a list of images from a search server 106, and the device 104 then queries another server to assign impacts to at least some of the images.

The method continues in step 304, where at least some of the images are assigned a display size based, at least in part, on the assigned impact. Generally, an image with a larger impact is assigned a larger display size.

Most embodiments consider other factors when assigning the actual display sizes, such as the number of images to be shown simultaneously and the size of the display screen 200. Some embodiments consider the relative magnitudes of the assigned impacts and reflect these relative magnitudes in the relative sizes assigned to the images.

In step 306, some of the images are rendered to the display screen 200 of the electronic device 104. The sizes of the images are as assigned in step 304. The larger size images tend to draw the user's attention. Thus, the method of FIG. 3 directs the attention of the user 102 to those images which have larger anticipated impacts, rather than, as in the prior art, presenting all images on an equal footing.

Figure 4A:
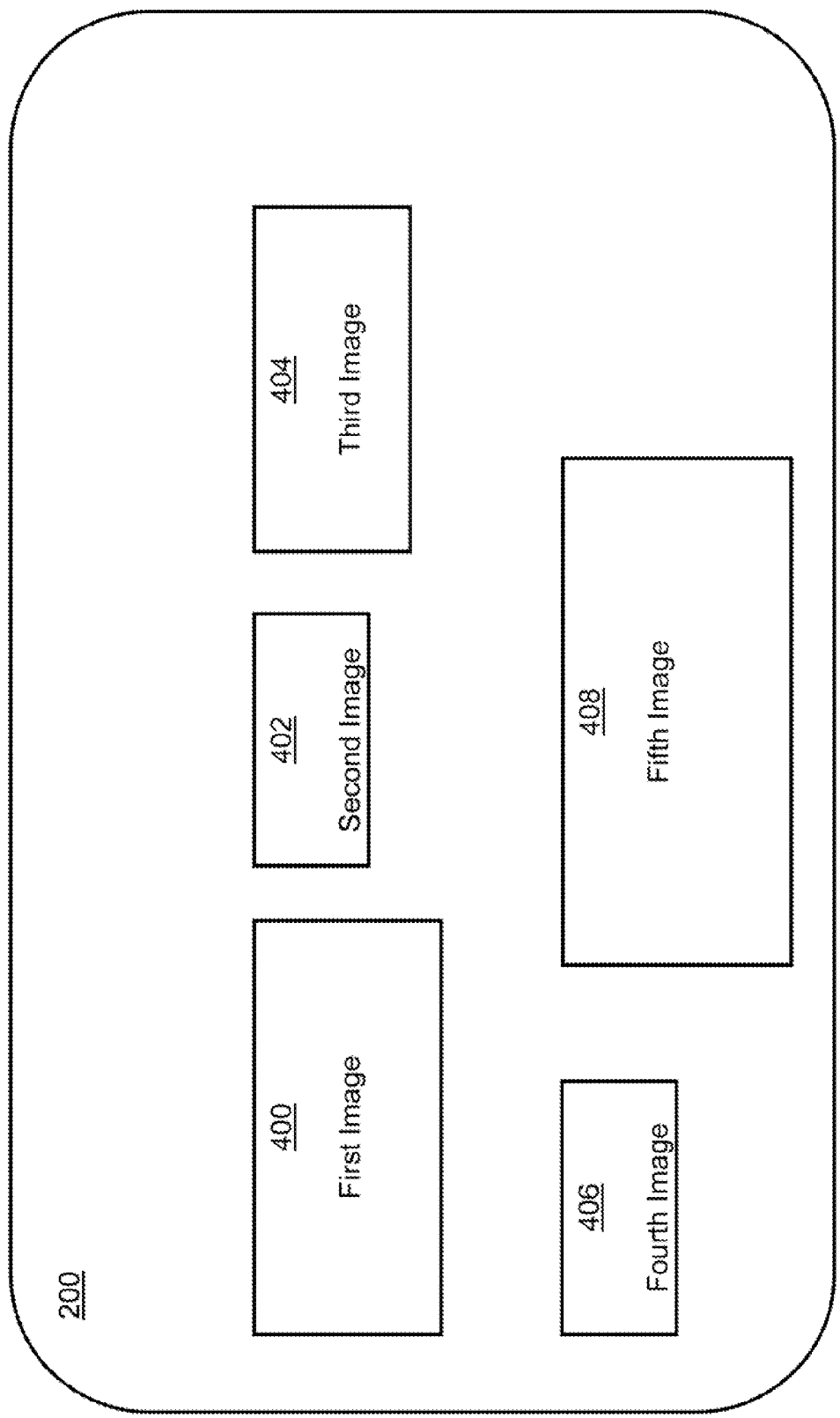
FIGS. 4a and 4b are exemplary screen shots illustrating the output of an embodiment of the present invention.

In some embodiments, the method of steps 300 through 306 is enhanced by arranging the rendered images in a specific way on the screen 200 of the electronic device 104. FIG. 4a presents a first example of this. In FIG. 4a, the images 400 through 408 are presented, left to right, then top to bottom, in the order of relevance as assigned by a search engine. This example shows that impact order may not match relevance order, as image 408 has the fifth highest relevance as determined by the search engine, but it has the highest impact (408 is the largest image).

Another arrangement (not shown) puts the images 400 through 408 in the order of assigned impact, left to right, then top to bottom. In this case, image 408 would be at the top left (at the beginning of the first row), and image 406 would be at the end of the second row (bottom right).

Figure 4B:
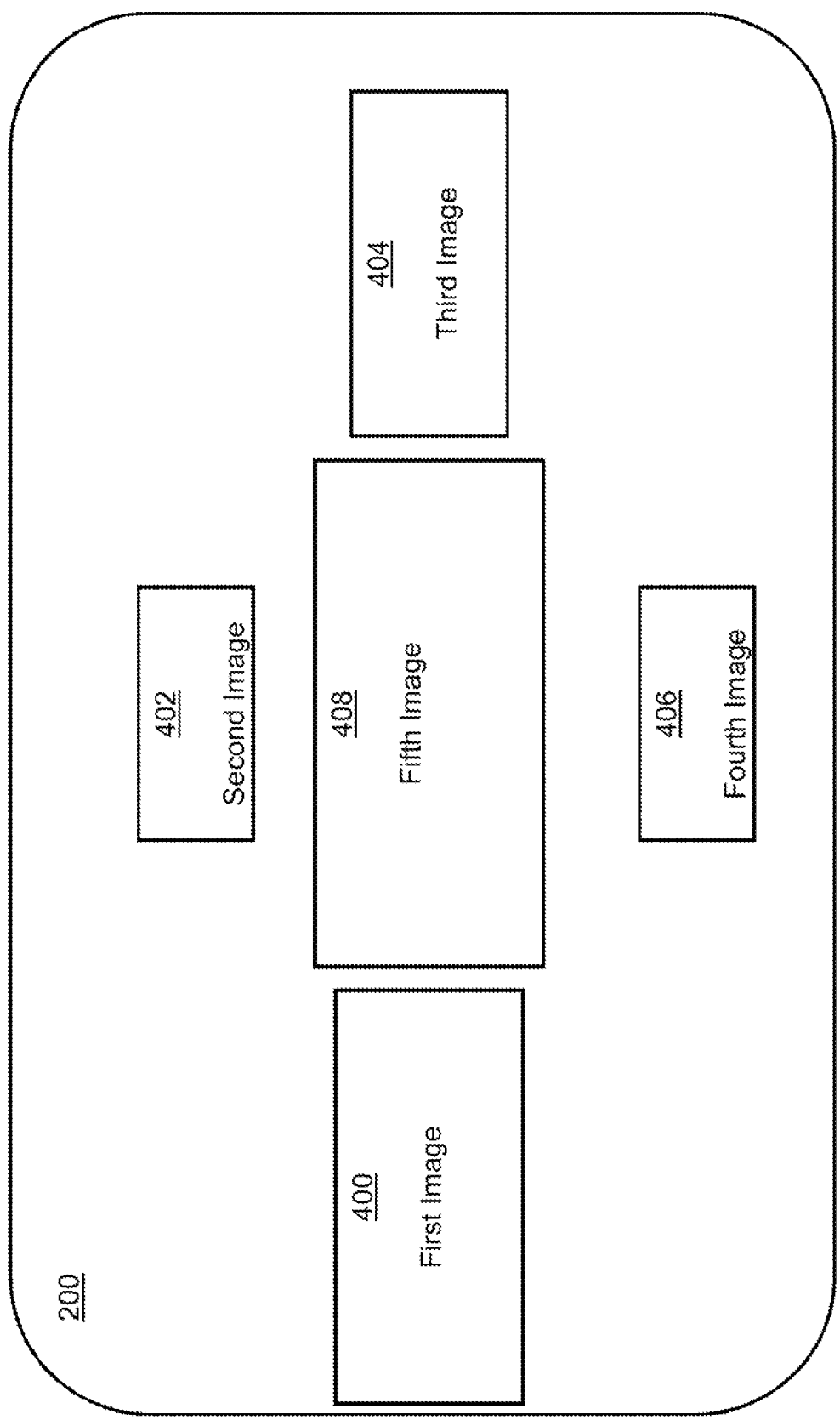

FIG. 4b shows the same images 400 through 408 as in FIG. 4a but arranged around the center of the display 200 in order of decreasing impact. Image 408 has the largest anticipated impact, so gets pride-of-place: the center of the display 200. Images 400 and 404 are the next larger and are put near to the center. Images 402 and 406 are smallest and are given "less desirable" locations. This arrangement, along with the different image sizes, draws the user's attention directly to the image with the largest anticipated impact.

The arrangement of FIG. 4b is just one example of placing the images with the greatest impact in the most "visually attentive" regions of the display 200. Another embodiment employs the well known "rule-of-thirds" of visual composition. Here, rather than clustering the greatest impact images around the center, these images are preferentially placed at the intersections of an invisible grid that divides the display 200 into three equally sized horizontal rows and three equally sized vertical columns. This is an aesthetically pleasing arrangement that again draws the user's attention to the images with the greatest impact.

The arrangements given above can include many more images than shown in FIGS. 4a and 4b. Of course, there is a trade-off between showing many images (which would on average have to be small to fit onto the display screen 200) and emphasizing the impact of a few images by making them much larger, thus leaving less room for other images on the display 200.

In view of the many possible embodiments to which the principles of the present invention may be applied, it should be recognized that the embodiments described herein with respect to the drawing figures are meant to be illustrative only and should not be taken as limiting the scope of the invention. For example, different embodiments will define "anticipated impact" differently depending upon what is perceived to be important. Therefore, the invention as described herein contemplates all such embodiments as may come within the scope of the following claims and equivalents thereof.

We claim:

1. A method for rendering a plurality of images on a display of an electronic device, the method comprising:
   receiving a list of a plurality of images;
   for at least some of the images on the list, assigning to each image an anticipated impact;
   for at least some of the images assigned an anticipated impact, assigning to each image a display size, the assigned size based, at least in part, on the anticipated impact assigned to the image; and
   for at least some of the images assigned a display size, rendering each image in its assigned display size on the display of the electronic device, wherein the rendered displays of at least two images are of different sizes;
   wherein the list of a plurality of images includes a relevance for each image; and
   wherein the anticipated impact assigned to an image is independent of the relevance of the image.

2. The method of claim 1 wherein the list of a plurality of images is received as a result of a search initiated by a user of the electronic device.

3. The method of claim 1 wherein the images are selected from the group consisting of: still images and video images.

4. The method of claim 1 further comprising:
   arranging the rendered images on the display of the electronic device, wherein the arranging is based, at least in part, on the relevances of the rendered images.

5. The method of claim 4 wherein the arranging comprises ordering the rendered images in order of decreasing relevance.

6. The method of claim 1 wherein assigning to an image an anticipated impact comprises receiving the anticipated impact from a device remote from the electronic device.

7. The method of claim 1 wherein an anticipated impact of an image is based, at least in part, on an anticipated benefit assigned by a provider of the image.

8. The method of claim 7:
   wherein the image is a video; and
   wherein the anticipated impact assigned to the video is based, at least in part, on a length of the video.

9. The method of claim 1 wherein a display size assigned to an image is based, at least in part, on an element selected from the group consisting of: an anticipated impact assigned to another image, a number of images to be rendered on the display of the electronic device, a size of an available display area on the display of the electronic device, and a rank order of the image in the received list.

10. The method of claim 1 wherein the rendering is selected from the group consisting of: two-dimensional rendering and three-dimensional rendering.

11. The method of claim 1 further comprising:
    arranging the rendered images on the display of the electronic device, wherein the arranging is based, at least in part, on the display sizes of the rendered images.

12. The method of claim 11 wherein the arranging comprises ordering the rendered images in order of decreasing display size.

13. The method of claim 1 wherein the arranging comprises placing rendered images with larger display sizes nearer a center of an available display area on the display of the electronic device than rendered images with smaller display sizes.

14. An electronic device comprising:
    a display screen; and
    a processor operatively coupled to the display screen, the processor configured for:
      receiving a list of a plurality of images;
      for at least some of the images on the list, assigning to each image an anticipated impact;
      for at least some of the images assigned an anticipated impact, assigning to each image a display size, the assigned size based, at least in part, on the anticipated impact assigned to the image; and
      for at least some of the images assigned a display size, rendering each image in its assigned display size on the display, wherein the rendered displays of at least two images are of different sizes;
    wherein the list of a plurality of images includes a relevance for each image;
    wherein the anticipated impact assigned to an image is independent of the relevance of the image; and
    wherein the processor is further configured for arranging the rendered images on the display, wherein the arranging is based, at least in part, on the relevances of the rendered images.

15. The electronic device of claim 14 wherein the device is selected from the group consisting of: a personal computer, a cell phone, a personal digital assistant, a television with a two-dimensional display, a television with a three-dimensional display, a digital sign, and a shopping kiosk.

16. The electronic device of claim 14 further comprising:
    a communications interface operatively coupled to the processor and configured for receiving the list of a plurality of images from a device remote from the electronic device.

17. The electronic device of claim 16 wherein the communications interface is further configured for receiving the anticipated impacts from a device remote from the electronic device.

18. The electronic device of claim 14 wherein the processor is further configured for assigning a display size to an image based, at least in part, on an element selected from the group consisting of: an anticipated impact assigned to another image, a number of images to be rendered on the display of the electronic device, a size of an available display area on the display of the electronic device, and a rank order of the image in the received list.

19. The electronic device of claim 14 wherein the processor is further configured for arranging the rendered images on the display, wherein the arranging is based, at least in part, on the display sizes of the rendered images.

* * * * *